United States Patent
Agarwal et al.

(10) Patent No.: US 7,398,438 B2
(45) Date of Patent: Jul. 8, 2008

(54) METHOD AND APPARATUS FOR IMPROVED ROUTING IN CONNECTIONLESS NETWORKS

(75) Inventors: Sugam Agarwal, New Delhi (IN); Muralidharan Sampath Kodialam, Marlboro, NJ (US); Tirunell V. Lakshman, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 87 days.

(21) Appl. No.: 11/394,356

(22) Filed: Mar. 30, 2006

(65) Prior Publication Data

US 2007/0263592 A1    Nov. 15, 2007

(51) Int. Cl.
*G01R 31/28* (2006.01)
(52) U.S. Cl. .................. 714/717; 370/254; 370/255
(58) Field of Classification Search ............ 379/221.06; 370/409, 248, 396, 331, 338, 254, 255; 714/717
See application file for complete search history.

(56) References Cited

U.S. PATENT DOCUMENTS

| | | | | |
|---|---|---|---|---|
| 5,377,262 | A * | 12/1994 | Bales et al. | 379/221.06 |
| 5,430,729 | A * | 7/1995 | Rahnema | 370/409 |
| 5,537,392 | A * | 7/1996 | Wille et al. | 370/248 |
| 5,805,593 | A * | 9/1998 | Busche | 370/396 |
| 5,925,137 | A * | 7/1999 | Okanoue et al. | 714/4 |
| 5,987,011 | A * | 11/1999 | Toh | 370/331 |
| 6,304,556 | B1 * | 10/2001 | Haas | 370/254 |
| 6,744,740 | B2 * | 6/2004 | Chen | 370/255 |
| 6,980,537 | B1 * | 12/2005 | Liu | 370/338 |
| 2003/0099194 | A1 | 5/2003 | Youngseok et al. | |
| 2004/0049595 | A1 | 3/2004 | Mingzhou et al. | |
| 2004/0246905 | A1 | 12/2004 | Dunagan et al. | |

FOREIGN PATENT DOCUMENTS

WO        WO 02/23807 A        3/2002
WO PCT/US2007/006803        1/2008

* cited by examiner

*Primary Examiner*—David Ton (57) ABSTRACT

The invention includes a method and apparatus for determining a routing table for use in a network comprising a plurality of type-one nodes and a plurality of type-two nodes where the type-two nodes use respective type-two routing tables having one next-hop node associated with each of a plurality of destination nodes of the network. The method includes obtaining, from the type-one nodes and the type-two nodes, link status information associated with each of a plurality of links of the network, obtaining traffic measurement information from the type-one nodes and the type-two nodes, and determining, using the link status and traffic measurement information, type-one routing tables for the respective type-one nodes. The type-one routing tables are determined as a group in a substantially coordinated manner, and each type one routing table includes a plurality of next-hop nodes associated with each of the destination nodes.

22 Claims, 8 Drawing Sheets

METHOD AND APPARATUS FOR IMPROVED ROUTING IN CONNECTIONLESS NETWORKS

FIELD OF THE INVENTION

The invention relates to the field of communication networks and, more specifically, to routing in connectionless networks.

BACKGROUND OF THE INVENTION

The scalability and resiliency of connectionless networks is evident from the ubiquity and rapid growth of the Internet. Despite the success of connectionless networks, many service providers use connection-oriented networks for achieving global objectives such as network traffic engineering. This is primarily due to the fact that traffic management in connection oriented networks is operationally simpler than traffic management in connectionless networks. Specifically, service providers often use layer-two connection-oriented networks for achieving global objectives for layer-one connectionless networks. An example is the use of Multi-protocol Label Switching (MPLS) for carrying Internet Protocol (IP) traffic.

In connection-oriented networks, traffic is typically routed from source to destination along pre-determined paths. Since these pre-determined paths may be established and manipulated individually, it is possible to adjust the pre-determined paths to accommodate changing traffic conditions in the network. This accommodation of changing traffic conditions is important for providing a quality of service guarantee for traffic associated with pre-determined paths. Disadvantageously, connection-oriented networks require path establishment for supporting traffic flows originating in the network, making the scaling of connection-oriented networks difficult. Furthermore, failures in the network require explicit establishment of restoration paths, thereby reducing operational ease of connectionless networks.

Use of connection oriented networking, despite ease of deployment and scalability of connectionless networking, is due to the fact that connectionless networks typically use shortest-path, hop-by-hop routing. The use of shortest-path, hop-by-hop routing is well-suited for maintaining best-effort connectivity (e.g., as is done using widely deployed routing protocols such as OSPF), however, maintaining connectivity is not the only objective for service providers. In additional to maintaining connectivity, service providers seek efficient traffic management, effective capacity use (e.g., avoiding congestion on some links while other links remain underutilized), and like objectives. Disadvantageously, while such network-wide objectives are easier to meet with connection-oriented networks than with routing currently employed in connectionless networks, connection-oriented networks are not as scalable as connectionless networks.

SUMMARY OF THE INVENTION

Various deficiencies in the prior art are addressed through the invention of a method and apparatus for determining a routing table for use in a network comprising a plurality of type-one nodes and a plurality of type-two nodes where the type-two nodes use respective type-two routing tables having one next-hop node associated with each of a plurality of destination nodes of the network. The method includes obtaining, from the type-one nodes and the type-two nodes, link status information associated with each of a plurality of links of the network, obtaining traffic measurement information from the type-one nodes and the type-two nodes, and determining, using the link status and traffic measurement information, type-one routing tables for the respective type-one nodes. The type-one routing tables are determined as a group in a substantially coordinated manner, and each type one routing table includes a plurality of next-hop nodes associated with each of the destination nodes.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables traffic management functions typically achieved in connection-oriented networks to be achieved in connectionless networks. The present invention replaces a portion of the standard nodes (e.g., standard routers) in a network with flexible nodes (e.g., flexible routers). The standard routers include standard traffic routing capabilities (i.e., shortest path routing). The standard nodes select a next-hop node for a given destination node using routing tables determined locally by the respective standard nodes. The flexible nodes include enhanced traffic routing capabilities (e.g., additional flexibility in selecting from more than one next-hop node for routing traffic toward destination nodes). The flexible nodes select one of a plurality of next-hop nodes for a given destination node using respective routing tables determined centrally by a controller using information obtained from the standard and flexible nodes.

In the present invention, routing tables associated with respective flexible nodes are determined by a controller. The controller obtains link status information from the standard nodes and flexible nodes (e.g., using one or more protocols). The standard nodes and flexible nodes perform traffic measurements and provide the traffic measurement information to the controller. The controller uses the link status and traffic measurement information for determining routing tables for respective flexible nodes. The controller determines the routing tables for the flexible nodes as a group in a substantially coordinated manner. The controller distributes the routing tables to the respective flexible nodes for routing traffic, thereby enabling the controller to manipulate traffic within the network by implementing coordinated routing table changes across routing tables of a group of respective flexible nodes.

The present invention enables the network to handle unexpected traffic patterns while retaining the scalability of connectionless networking. In other words, the present invention retains the resiliency and scalability of connectionless networks while providing the ability to manage traffic by adaptively and dynamically changing the routing in the network to accommodate different traffic patterns. In one embodiment, the present invention is implemented in a manner such that modifications to existing protocols utilized in connectionless networks are not required. In one embodiment, the present invention is implemented in a manner such that flexible nodes seamlessly interoperate with standard nodes (i.e., the enhanced flexible nodes are backwards compatible with existing standard nodes).

Figure 1:
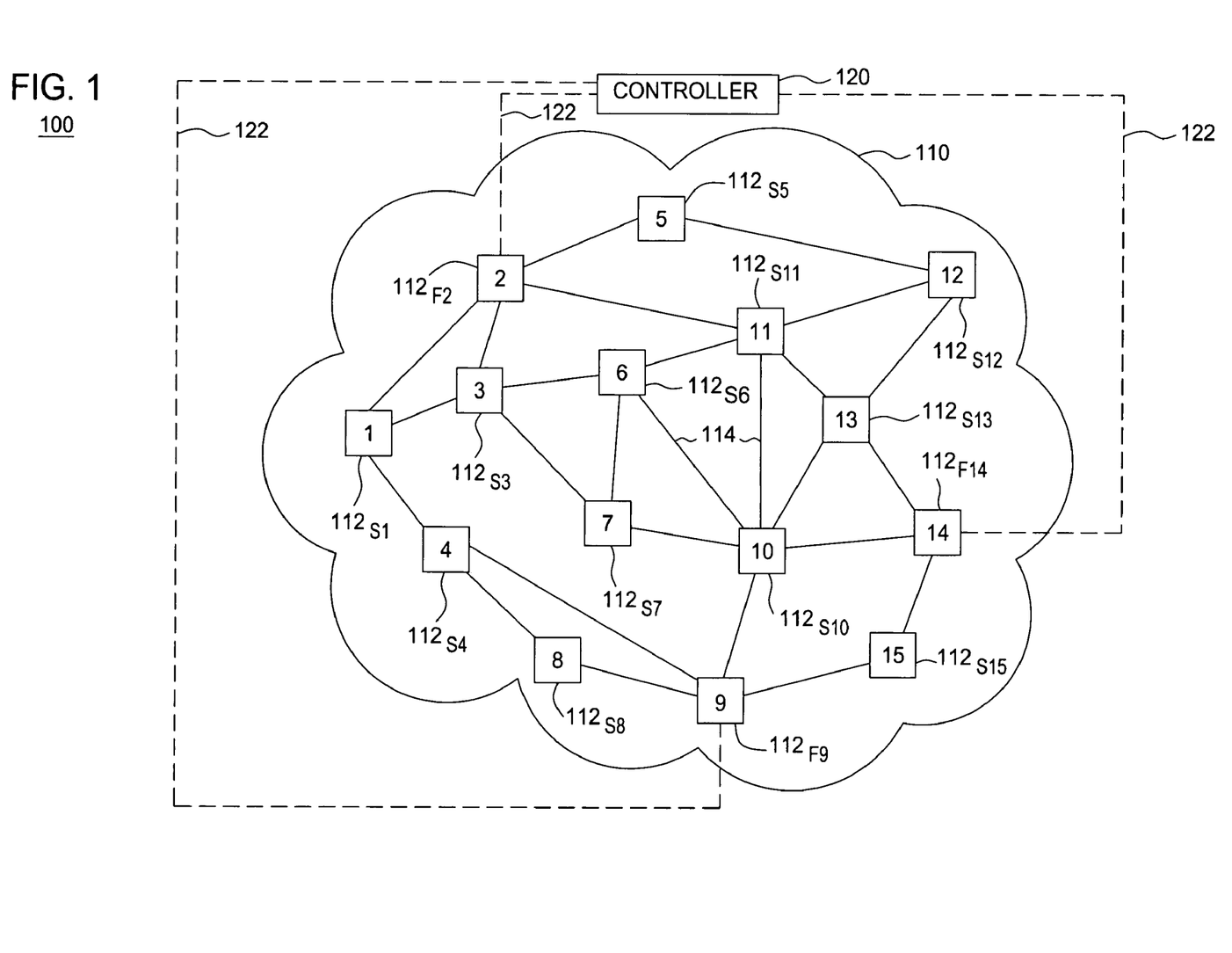
FIG. 1 depicts a high-level block diagram of a communication network.

FIG. 1 depicts a high-level block diagram of a communication network. Specifically, communication network 100 of FIG. 1 includes a network 110 and a controller 120. As depicted in FIG. 1, network 110 includes a plurality of standard routers (SRs) $112_{S1}$, $112_{S3}$-$112_{S8}$, $112_{S10}$-$112_{S13}$, and $112_{S15}$ (collectively, SRs $112_S$) and a plurality of flexible routers (FRs) $112_{F2}$, $112_{F9}$, and $112_{F14}$ (collectively, FRs $112_F$). The SRs $112_S$ and FRs $112_F$ may be collectively denoted as routers 112. The SRs $112_S$ and FRs $112_F$ may be generally referred to as type-two nodes and type-one nodes, respectively. The routers 112 operate as source nodes, intermediate nodes, and destination nodes for traffic transported within network 110. For purposes of clarity, each router 112 may be identified using an integer (e.g., $112_{S1}$, $112_{S3}$-$112_{S8}$, $112_{S10}$-$112_{S13}$, and $112_{S15}$ are denoted as nodes 1, 3-8, 10-13, and 15, and FRs $112_{F2}$, $112_{F9}$, and $112_{F14}$ are denoted as nodes 2, 9 and 14, respectively).

As depicted in FIG. 1, routers 112 communicate using a plurality of communication links (CLs) 114 (collectively, CLs 114). In one embodiment, each of the CLs 114 is a bidirectional communication link. In one embodiment, CLs 114 have at least one associated link parameter (e.g., link weight, link capacity, link bandwidth, and the like, as well as various combinations thereof). In one embodiment, for purposes of clarity, an assumption may be made that each of CLs 114 has an associated link weight equal to one. As depicted in FIG. 1, FRs $112_F$ communicate with controller 120 using a plurality of management links (MLs) 122 (collectively, MLs 122). Although, for purposes of clarity, controller 120 is not depicted as communicating with SRs $112_S$, controller 120 may communication with SRs $112_S$ directly using one or more links, indirectly via FRs $112_F$ and associated CLs 114, and the like, as well as various combinations thereof.

The SRs $112_S$ include standard routers (and may be referred to herein as standard nodes, non-flexible routers, or non-flexible nodes) operable for utilizing standard hop-by-hop packet forwarding mechanisms. The SRs $112_S$ utilize routing tables (generally referred to as non-flexible node routing tables or type-two routing tables) supporting a single next-hop node for a given destination node. In one embodiment, for example, next-hop nodes may be computed as in a standard Open Shortest Path First (OSPF) network. In one embodiment, SRs $112_S$ broadcast network information (e.g., topology information, link-state information, available link bandwidth information, and the like, as well as various combinations thereof) within network 110. In one embodiment, for example, network information is broadcast by SRs $112_S$ using OSPF—Link State Advertisement (OSPF-LSA) and OSPF—Traffic Engineering (OSPF-TE) messages. In one such embodiment, at least a portion of the network information broadcast by SRs $112_S$ is received by controller 120.

The FRs $112_F$ include enhanced routers (and may be referred to herein as enhanced nodes, flexible routers, or flexible nodes) operable for utilizing enhanced packet forwarding mechanisms. The FRs $112_F$ utilize enhanced routing tables (generally referred to as flexible node routing tables or type-one routing tables) supporting multiple next-hop nodes for a given destination node. The enhanced routing tables utilized by FRs $112_F$ may be computed by controller 120. In one embodiment, FRs $112_F$ perform traffic measurements for producing traffic measurement information. In one such embodiment, traffic measurement information may include injected traffic information, uncontrollable traffic information, and the like, as well as various combinations thereof. In one embodiment, FRs $112_F$ provide such traffic measurement information to controller 120. In one embodiment, SRs $112_S$ are unaware of the existence of FRs $112_F$.

In one embodiment, if there are multiple next-hops for a given destination node, FRs $112_F$ may split traffic to a destination node across the multiple next-hop nodes in a pre-specified manner. There are several ways of splitting traffic to a destination node across multiple next-hop nodes. In one embodiment, splitting of traffic to a destination node across multiple next-hop nodes may be performed in a manner for ensuring that a given traffic flow is not split across the multiple next-hop nodes. In one such embodiment, at least one additional traffic measurement is required for splitting traffic to a destination node across multiple next-hop nodes in a manner for ensuring that a given traffic flow is not split across the multiple next-hop nodes.

As depicted in FIG. 1, controller 120 determines routing tables for FRs $112_F$. In one embodiment, controller 120 utilizes link status information from SRs $112_S$ and FRs $112_F$ and traffic measurement information from FRs $112_F$ for determining routing tables for FRs $112_F$. In one embodiment, determination of routing tables for FRs $112_F$ comprises dynamically modifying existing routing tables of FRs $112_F$. The dynamic modification of existing routing tables associated with FRs $112_F$ enables controller 120 to adapt FRs $112_F$ to changing traffic conditions in network 110. In one embodiment, controller 120 processes routing tables of FRs $112_F$ for modifying at least a portion of the routing tables of FRs $112_F$ for effecting coordinated traffic routing changes across FRs $112_F$, thereby enabling effective traffic routing management (e.g., low delay, low packet losses, and the like) in response to changing traffic conditions in network 110.

Although depicted and described as including a specific configuration, including specific numbers of SRs $112_S$ and FRs $112_F$, the present invention may be used in communication networks having various other configurations of SRs $112_S$ and FRs $112_F$. Although depicted as a management system, in one embodiment, controller 120 may be implemented as a portion of a router. In one embodiment, controller 120 may be implemented as a portion of one of the SRs $112_S$ or one of the FRs $112_F$, or, alternatively, portions of functionality of controller 120 may be split across various combinations of SRs $112_S$ or FRs $112_F$. In one embodiment, controller 120 may be implemented as a router (not depicted) within network 110. In one such embodiment, the router may be configured to only receives status messages for computing flexible node routing tables (i.e., the router does not route traffic within network 110).

Figure 2:
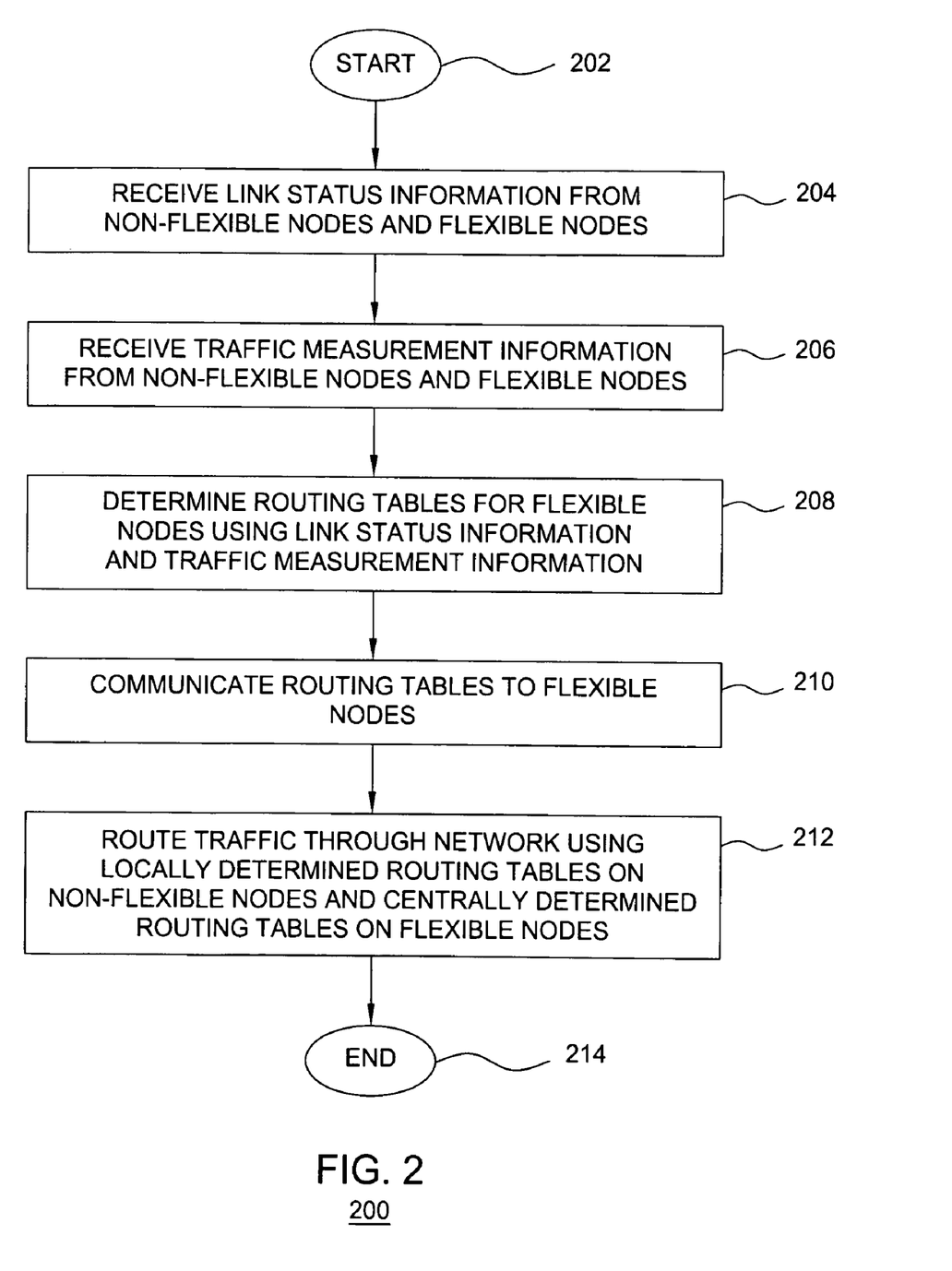
FIG. 2 depicts a method according to one embodiment of the present invention.

FIG. 2 depicts a method according to one embodiment of the present invention. Specifically, method 200 of FIG. 2 includes a method for determining routing tables associated with respective flexible nodes. Although described with respect to determining routing tables for a plurality of flexible nodes, method 200 may be used for determining a routing table for a network having one flexible node. Although depicted and described herein as being performed serially, those skilled in the art will appreciate that at least a portion of the steps of method 200 may be performed contemporaneously, or in a different order than presented in FIG. 2. The method 200 begins at step 202 and proceeds to step 204.

At step 204, link status information is received from non-flexible nodes and flexible nodes. In one embodiment, link status information includes link weights associated with communication links. In one such embodiment, link weights may be received using OSPF—Link State Advertisement (OSPF-LSA) messages. In one embodiment, link status information includes link capacities (and/or available link bandwidths) associated with communication links. In one such embodiment, link capacities may be received using OSPF—Traffic Engineering (OSPF-TE) messages. In one embodiment, link status information is received by a central controller (illustratively, controller 120) adapted for determining routing tables for flexible nodes.

At step 206, traffic measurement information is received from non-flexible nodes and flexible nodes. In one embodiment, traffic measurement information includes link utilization information. In one embodiment, link utilization information includes a measure of the utilization of each of at least a portion of the links in the network. In one embodiment, each flexible and non-flexible node measures link utilization for each of the links to which that node is directly connected. In one embodiment, link utilization may be represented as a percentage of total link capacity of the associated link. In one embodiment, traffic measurement information includes injected traffic information and uncontrollable traffic information.

In one embodiment, injected traffic information and uncontrollable traffic information is determined by the respective flexible nodes. An exemplary method for determining injected traffic information is depicted and described herein with respect to FIG. 3, FIG. 4, FIG. 5 and FIG. 6. An exemplary method for determining uncontrollable traffic information is depicted and described herein with respect to FIG. 3, FIG. 4, FIG. 5 and FIG. 7. In one embodiment, traffic measurement information is received by a central controller (illustratively, controller 120) adapted for determining routing tables for flexible nodes.

At step 208, routing tables associated with respective flexible nodes are determined using the link status information and the traffic measurement information. In one embodiment, routing tables associated with respective flexible nodes may be determined together as a group (i.e., each routing table for each flexible node in a flexible node group is determined taking into account respective at least one characteristic associated with every other routing table for every other flexible node in that flexible node group). In one embodiment, the at least one characteristic may include routing tables previously computed for the respective flexible nodes, current processing by which every other routing table for every other flexible node in that group is determined, and like characteristics, parameters, and information, as well as various combinations thereof.

In one embodiment, a flexible node may be associated with a flexible node group. In one embodiment, a flexible node may be associated with a plurality of flexible node groups. In one embodiment, a central controller (illustratively, controller 120) maintains flexible node group membership information indicative of which flexible nodes are associated with which flexible node group(s). In such embodiments, routing tables associated with respective flexible nodes in a flexible node group may be determined in a coordinated manner such that, by determining and setting the routing tables of the flexible nodes, the controller is thereby able to manipulate traffic within the network.

In one embodiment, a flexible node routing table includes an association of each possible destination node (including non-flexible nodes and flexible nodes) to a plurality of next-hop nodes available for selection by the flexible nodes for routing the traffic associated with the destination node toward that destination node. In one embodiment, a flexible node routing table may include an associated traffic split fraction associated with each next-hop node for each destination node (e.g., for split traffic flows intended for a given destination node across multiple paths).

At step 210, routing tables are communicated to the respective flexible nodes. At step 212, traffic is routed through the network by the non-flexible nodes and the flexible nodes. The traffic is routed by the non-flexible nodes using locally determined routing tables identifying one next-hop node for a given destination node. The traffic is routed by the flexible nodes using centrally determined routing tables identifying a plurality of next-hop nodes for a given destination node. At step 214, method 200 ends.

For purposes of clarity in describing the determination of a routing table for a flexible node, consider the following formulation. An assumption is made that a network (illustratively, network 110) includes a set of nodes N (illustratively, routers 112) interconnected by a set of directed links E (illustratively, communication links 114). An assumption is made that the network includes n nodes and m links. A notation is defined in which made $C \subseteq N$ denotes the set of flexible nodes (illustratively, FRs $112_F$) and $D=N\backslash C$ denotes the set of non-flexible nodes (illustratively, SRs $112_S$). A notation is defined in which w(e) denotes a link weight (e.g., OSPF link weight) of a link e∈E and c(e) denotes a link capacity (e.g., OSPF link capacity) of a link e∈E. A notation is defined in which f(e) denotes traffic flow on link e∈E. The traffic flow f(e) on all links e∈E is available to a controller (illustratively, controller 120) from a network information distribution protocol (e.g., OSPF-LSA, OSPF-TE, and the like).

A notation is defined in which $T_{sd}$ represents a traffic rate from a source node s∈N to a destination node d∈N. A notation is defined in which a node u may be a non-flexible node u∈D or a flexible node u∈C. A notation is defined in which $W_{ud}$ represents a total traffic amount for destination node d∈N that either originates on or passes through a flexible node u∈C. Note that, in general, $W_{ud} \geq T_{ud}$. In one embodiment, flexible node u is operable for measuring a total traffic amount $W_{ud}$ for each of the destination nodes d. In one such embodiment, flexible node u is operable for measuring total traffic amount $W_{ud}$ using at least one of a plurality of known methods. In one embodiment, the traffic rate $T_{sd}$ for all source-destination node pairs (s,d) is not known by the controller.

In one embodiment, each node n in the network computes a shortest path to every other node in the network. In one such embodiment, the routing table at node u∈N includes the next hop on the shortest path to each node in the network. In this embodiment, a notation is defined in which NH(u,d) denotes the next-hop node for destination node d at node u. In other words, in this embodiment, NH(u,d) denotes the first node on the shortest path from node u to destination node d. For purposes of clarity an assumption is made that the next-hop node is unique for all non-flexible nodes u∈D, i.e, NH(u,d) has only one element for each non-flexible u∈D.

Although primarily described herein with respect to embodiments in which the next-hop node is unique for each non-flexible node u∈D, i.e, NH(u,d) has only one element for each non-flexible node u∈D, in various other embodiments, a plurality of next-hop nodes may be available for each non-flexible node u, i.e., NH(u,d) may have one or more elements for each non-flexible node u∈D. In other words, in one embodiment, the present invention is extendible to networks in which there are alternate shortest paths between nodes. In this embodiment, traffic may be split between the alternate shortest paths. In one such embodiment, traffic may be split between the alternate shortest paths using equal cost multi-paths. Furthermore, although NH(u,d) is primarily described herein as being computed based on shortest paths for all non-flexible nodes u∈D, NH(u,d) may be set arbitrarily for each flexible node u∈C as long as there are no routing loops.

Figure 3:
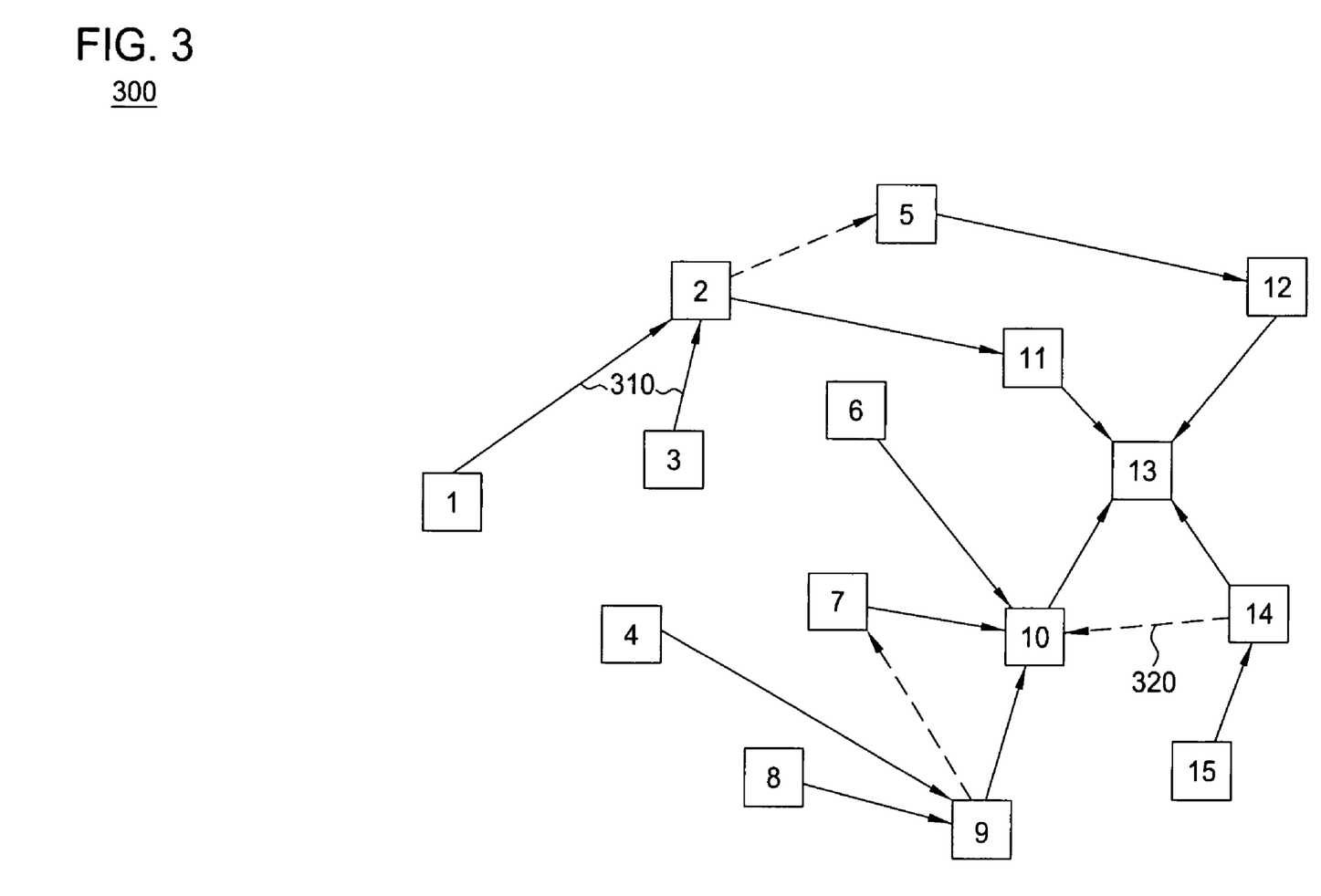
FIG. 3 depicts a high-level block diagram of a shortest-path tree of the communication network of FIG. 1.

FIG. 3 depicts a high-level block diagram of a shortest path tree of the communication network of FIG. 1. Specifically, FIG. 3 depicts a high-level block diagram of a shortest path tree 300 to node 13 of communication network 100 of FIG. 1. As depicted in FIG. 3, a plurality of links 310 (collectively, links 310) depicted as solid lines represent the shortest-path tree 300 to node 13. It should be noted that shortest path tree 300 comprises the shortest path tree that would result if the flexible nodes were operating as non-flexible nodes (i.e., if the flexible nodes were utilizing standard shortest path computation instead of enhanced shortest path computation). As depicted in FIG. 3, a plurality of alternate links 320 (collectively, alternate links 320) depicted as dotted lines represent the alternate links associated with the flexible nodes. For purposes of clarity, an assumption is made that links 310 and alternate links 320 have associated link weights equal to one.

As depicted in FIG. 3, next-hop nodes NH(u,d) for each non-flexible node u∈D include NH(1,13)=2, NH(3,13)=2, NH(4,13)=9, NH(5,13)=12, NH(6,13)=10, NH(7,13)=10, NH(8,13)=9, NH(10,13)=13, NH(11,13)=13, NH(12,13) =13, and NH(15,13)=14. As depicted in FIG. 3, the next-hop nodes NH(u,d) for flexible node 2∈C include NH(2,13)=5 (alternate path) and NH(2,13)=11 (shortest path), the next-hop nodes NH(u,d) for flexible node 9∈C include NH(9,13)=7 (alternate path) and NH(9,13)=10 (shortest path), and the next-hop nodes NH(u,d) for flexible node 14∈C include NH(14,13)=10 (alternate path) and NH(14,13)=13 (shortest path). In other words, flexible node 2 may split traffic to node 13 across two different next-hop nodes 5 and 11, flexible node 9 may split traffic to node 13 across two different next-hop nodes 7 and 10, and flexible node 14 may split traffic to node 13 across two different next-hop nodes 10 and 13.

For purposes of clarity in describing the present invention, a first definition is defined in which, given the set of flexible nodes C, a path $s=u_0, u_1, u_2, \ldots u_k=d$ from a source node s to a destination node d will be termed a feasible path if for j=1,2, ..., k, $(u_{j-1}, u_j) \in E$ and $u_j = NH(u_{j-1}, d)$ if $u_{j-1} \in D$. A feasible path where $u_1, u_2, \ldots, u_k$ are distinct is denoted as an admissible path. The set of admissible paths between source node s and destination node d is denoted as $P_{sd}$. From the definition, a path is feasible if the next-hop to a given destination for all the non-flexible nodes is given by the shortest path algorithm, and a feasible path is admissible only if it is loopless. As such, all traffic between the source node s and the destination node d must be routed on $p \in P_{sd}$.

For example, as depicted in FIG. 3, the path 3-2-5-12-13 is an admissible path from source node 3 to destination node 13. This admissible path, however, is not the shortest path from source node 3 to destination node 13. Rather, the shortest path from source node 3 to destination node 13 is the path 3-2-11-13, which only requires three hops from source node 3 to destination node 13. Although the path 3-6-11-13 only requires three hops from source node 3 to destination node 13, path 3-6-11-13, however, is not admissible since the next hop for node 3 which is a non-flex node has to be the next hop on the shortest path, which is node 2.

For purposes of clarity in describing the present invention, a second definition is defined in which, given shortest path routing at the non-flexible nodes, traffic that travels from source to destination without traversing a flexible node will be referred to as uncontrollable traffic, while traffic that originates on a flexible node (i.e., a flexible node is the source node for the traffic) or traverses at least one flexible node before reaching the destination node will be referred to as controllable traffic. In other words, controllable traffic includes packets that traverse at least one flexible node. As such, there is at least an opportunity at the flexible nodes to manipulate the path of controllable traffic.

For example, traffic from node 6 to node 13 is routed (optionally, by OSPF) along the path 6-10-13, however, since neither node 6 nor node 10 are flexible nodes, traffic from node 6 to node 13 is uncontrollable traffic. Similarly, traffic from node 5 (originating on node 5) to node 13 is routed along the path 5-12-13, however, since neither node 5 nor node 12 are flexible nodes, traffic from node 5 to node 13 is uncontrollable traffic. In contrast, since traffic from node 8 to node 13 passes through flexible node 9, traffic from node 8 to node 13 is controllable traffic. Similarly, since traffic from node 15 to node 13 passes through flexible node 14, traffic from node 15 to node 13 is controllable traffic.

For purposes of clarity in describing the present invention, a third definition is defined in which a packet is considered to be injected by a flexible node u∈C if: (1) flexible node u is on the routing path (e.g., OSPF routing path) for the packet; and (2) the packet traverses flexible node u before traversing any other flexible node. The traffic that is injected by flexible node u∈C to some destination node d∈N is denoted as $I_{ud}$. In other words, for all controllable traffic there is a unique flexible node that injects the controllable traffic. A flexible node that injects traffic into the network may or may not be a source node for the injected traffic. The specifics of the third definition are further described herein with respect to FIG. 4.

Figure 4:
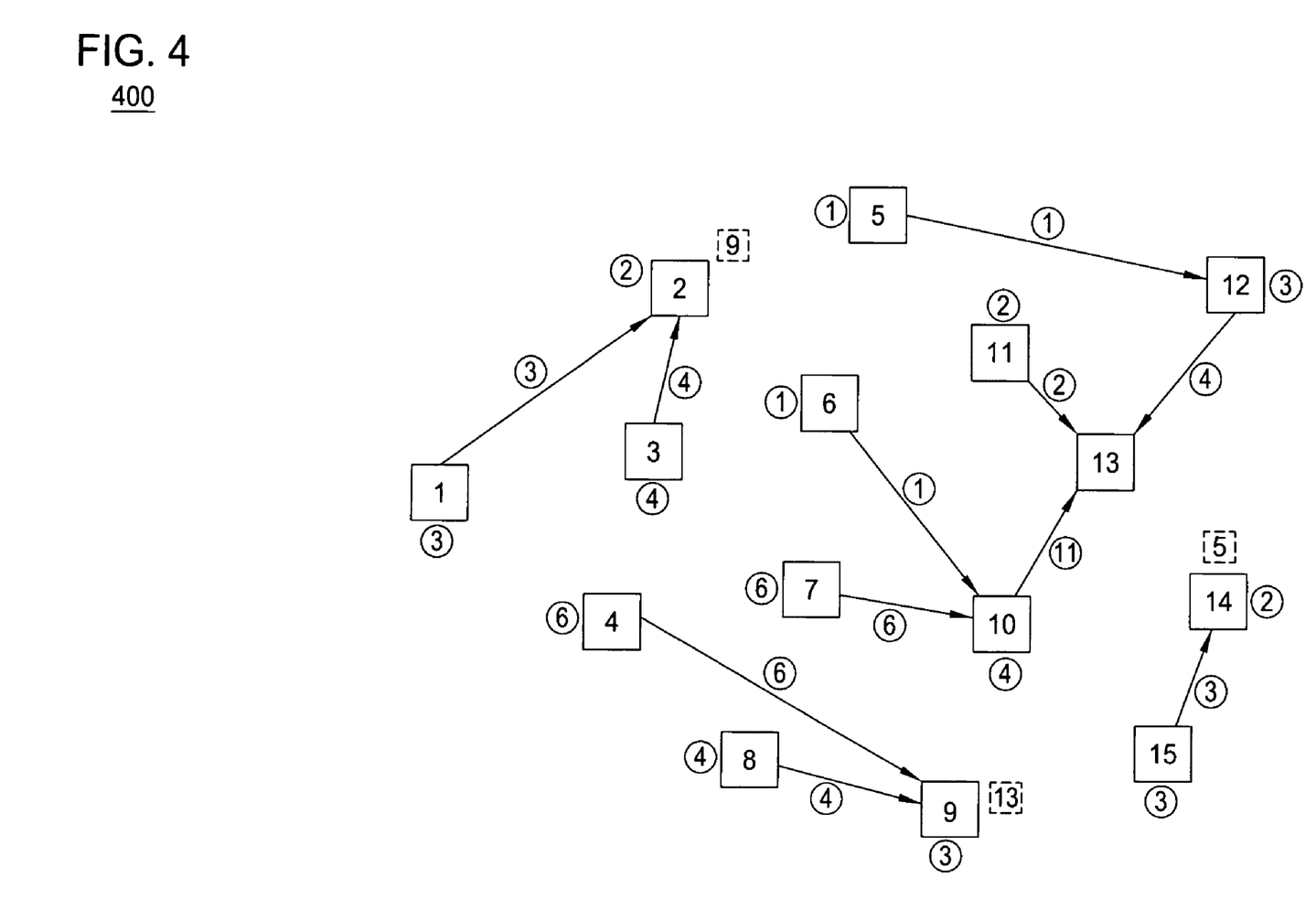
FIG. 4 depicts a high-level block diagram of the independently routable traffic at the flexible nodes of the communication network of FIG. 1.

FIG. 4 depicts a high-level block diagram of the independently routable traffic at the flexible nodes of the communication network of FIG. 1. In general, FIG. 4 depicts a high-level block diagram of portions of shortest path tree 300 of FIG. 3. In particular, FIG. 4 depicts each of the links 310 of FIG. 3 except links 310 from each of the flexible nodes toward destination node 13 (i.e., except for links from flexible node 2 to node 11, from flexible node 9 to node 10, and from flexible node 14 to node 13). As depicted in FIG. 4, the numbers next to each of the nodes represents the traffic rate (or, alternatively, traffic amount) originating from that node to destination node 13. As depicted in FIG. 4, the numbers next to each of the links represents the traffic rate on that link (i.e., combination of traffic rates associated with each downstream node in the shortest path tree towards node 13).

As described herein, a notation is defined in which $T_{sd}$ represents a traffic rate from a source node s∈N to a destination node d∈N. As depicted in FIG. 4, node 1 has a traffic rate of three (i.e., $T_{1,13}=3$), node 3 has a traffic rate of four (i.e., $T_{3,13}=4$), node 4 has a traffic rate of six (i.e., $T_{4,13}=6$), node 5 has a traffic rate of one (i.e., $T_{5,13}=1$), node 6 has a traffic rate of one (i.e., $T_{6,13}=1$), node 7 has a traffic rate of six (i.e., $T_{7,13}=6$), node 8 has a traffic rate of four (i.e., $T_{8,13}=4$), node 10 has a traffic rate of four (i.e., $T_{10,13}=4$), node 11 has a traffic rate of two (i.e., $T_{11,13}=2$), node 12 has a traffic rate of three (i.e., $T_{12,13}=3$), node 14 has a traffic rate of two (i.e., $T_{14,13}=2$), and node 15 has a traffic rate of three (i.e., $T_{15,13}=3$).

As described herein, a third definition is defined in which a packet is considered to be injected by a flexible node u∈C if: (1) flexible node u is on the routing path for the packet; and (2) the packet traverses flexible node u before traversing any other flexible node. The traffic injected by flexible node u∈C to destination node d∈N is denoted as $I_{ud}$. As depicted in FIG. 4, traffic from nodes 1 and 3 to node 13 is injected by flexible node 2 (i.e., $I_{2,13}=9$ since node 1 provides a traffic rate of three, node 3 provides a traffic rate of four, and node 2 provides a traffic rate two). As depicted in FIG. 4, traffic from nodes 4 and 8 to node 13 is injected by flexible node 9 (i.e., $I_{9,13}=13$ since node 4 provides a traffic rate of six, node 8 provides a traffic rate of four, and node 9 provides a traffic rate three). As depicted in FIG. 4, traffic from node 15 to node 13 is injected by flexible node 14 (i.e., $I_{14,13}=5$ since node 15 provides a traffic rate of three and node 14 provides a traffic rate two).

In other words, as described herein, if the values of $T_{sd}$ are known for all source-destination node pairs (s,d), then the value of $I_{ud}$ may be computed. Specifically, if the values of $T_{sd}$ are known for all source-destination node pairs (s,d), then the value of $I_{ud}$ may be computed by removing the egress links of the flexible nodes and letting a routing protocol (e.g., OSPF) route all demands until reaching the flexible nodes or the destination node. The traffic that accumulates at the flexible nodes is the traffic that is injected by the flexible nodes. As depicted in FIG. 4, $I_{2,13}=9$, $I_{9,13}=13$, and $I_{14,13}=5$. The $T_{sd}$ values however, are not known to the controller (illustratively, controller 120), rather, in one embodiment, the only measurements available at the controller are $W_{ud}$ values (i.e., the traffic for destination d that passes through node u∈C).

Since, as described herein, the only traffic that may be manipulated is traffic that traverses the flexible nodes, in one embodiment, a distinction is made between controllable traffic and uncontrollable traffic. As described herein, $I_{ud}$ denotes traffic injected by flexible node u∈C to destination node d∈N, and traffic injected by flexible node u may only reach destination node d along one of the admissible paths p∈$P_{sd}$. A notation is defined in which g(e) denotes the uncontrollable traffic flow on link e∈E. Although g(e) may be computed if source-destination traffic rate values $T_{sd}$ are known in advance, as described herein, source-destination traffic rate values $T_{sd}$ are not known in advance.

As described herein, in one embodiment, the objective of the controller is to route controllable traffic such that packet delay and packet loss at the links are minimized. In one embodiment, since the packet delay and packet loss at the links are increasing functions of link utilization, link utilization may be used as a surrogate for the packet delay and packet loss at the link. In one such embodiment, an objective of the controller is to minimize the maximum utilization of the links in the network. In one such formulation, the variables, which may be solved to any desired level of accuracy, may be path flow associated with path P. In one such formulation, path flow associated with path P may be denoted as x(P). In one such embodiment, the controller solves the following optimization problem in which the controller attempts to minimize the maximum link utilization (denoted as Θ):

$$g(e) + \sum_{P:P \ni e} x(P) \leq \Theta c(e) \quad \forall e \in E \qquad \text{Eq. 1}$$

$$\sum_{P \in P_{ud}} x(P) \geq I_{ud} \quad \forall u \in C \quad d \in N \qquad \text{Eq. 2}$$

-continued $$x(P) \geq 0 \quad \forall P \qquad \text{Eq. 3}$$

The first set of inequalities (Eq. 1) ensures that the total flow on the link (which is the sum of the uncontrollable flow on the link (denoted as g(e)) and the controllable flow on the link (denoted as Σx(P))) is less than or equal to a product of the maximum link utilization (denoted as Θ) and the link capacity (denoted as c(e)). The second set of inequalities (Eq. 2) ensures that the total injected traffic associated with the flexible nodes is routed in the network (i.e., ensures that the sum of controllable flow on the link for each admissible path P in the set of admissible paths $P_{ud}$ between each flexible node u∈C and destination node d (denoted as Σx(P)) is greater than or equal to traffic injected by flexible node u∈C to destination node d∈N (denoted as $I_{ud}$).

In this min-max utilization formulation, the optimum value of the maximum link utilization Θ is the maximum utilization of any link, and the controller attempts to solve the formulation in a manner for minimizing the maximum link utilization Θ. In this formulation, if the optimal value of maximum link utilization is less than one (Θ<1), none of the links are overutilized. In one embodiment, the min-max utilization formulation is solved by the controller. In one embodiment, after solving this optimization problem, the controller determines, for each flexible node, each next-hop node associated with the flexible node, and each associated traffic fraction associated with each next-hop node, for each destination node.

In one embodiment, the controller determines routing tables for respective flexible nodes using injected traffic values $I_{ud}$ on each flexible node and the uncontrollable flow g(e) on each link. In one embodiment, the controller determines the injected traffic values $I_{ud}$ on each flexible node and the uncontrollable flow g(e) on each link. In one embodiment, the injected traffic values $I_{ud}$ on each flexible node and the uncontrollable flow g(e) on each link may be determined using network information (e.g., network topology information, link status information and the like) and traffic measurement information (e.g., measurements made by the flexible nodes and transmitted from the flexible nodes to the controller).

Figure 5:
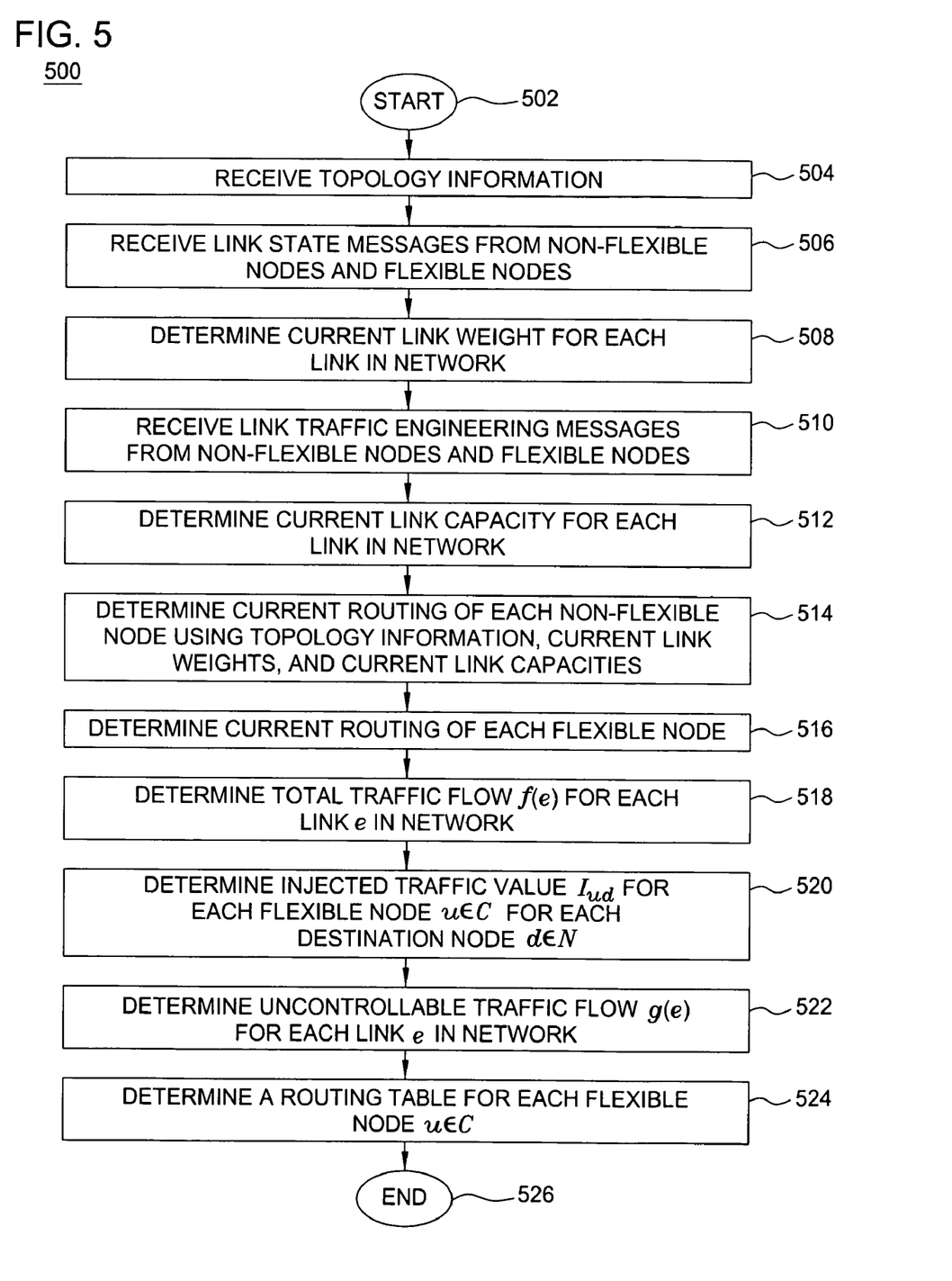
FIG. 5 depicts a method according to one embodiment of the present invention.

FIG. 5 depicts a method according to one embodiment of the present invention. Specifically, method 500 of FIG. 5 includes a method for determining routing tables associated with respective flexible nodes. Although described with respect to operations performed on a controller adapted for determining routing tables for respective flexible nodes, in one embodiment, at least a portion of the steps of method 500 may be performed by the respective flexible nodes. Although depicted and described as being performed serially, those skilled in the art will appreciate that at least a portion of the steps of method 500 may be performed contemporaneously, or in a different order than presented in FIG. 5. The method 500 begins at step 502 and proceeds to step 504.

At step 504, topology information is obtained. In one embodiment, topology information is obtained from at least one database associated with a controller. In one embodiment, topology information is received from non-flexible and flexible nodes. At step 506, link state messages are received from non-flexible nodes and flexible nodes. In one embodiment, link state messages include OSPF-LSA messages. At step 508, a current link weight is determined for each link in the network (i.e., for each link e∈E). At step 510, link traffic engineering messages are received from non-flexible nodes and flexible nodes. In one embodiment, link traffic engineering messages include OSPF-TE messages. At step 512, a current link capacity (e.g., available bandwidth) is determined for each link in the network (i.e., for each link e∈E).

At step 514, current routing performed by each non-flexible node is determined using the topology information, current link weights, and current link capacities. Although not depicted, in one embodiment, current routing performed by each non-flexible node may be determined by obtaining routing tables utilized by respective non-flexible nodes. At step 516, current routing of each flexible node is determined. In one embodiment, current routing of each flexible node is determined using a previously determined routing table associated with each respective flexible node (e.g., determined routing tables associated with flexible nodes may be stored by the controller).

At step 518, total traffic flow f(e) is determined for each link in the network. In one embodiment, total traffic flow f(e) for each link in the network is determined using the current routing of each non-flexible node and each flexible node. In one embodiment, given current link weights (e.g., OSPF-LSA link weights) and current link capacities (e.g., OSPF-TE link capacities), the controller may determine the current routing for all non-flexible nodes. In one embodiment, since the controller computed routing tables for respective flexible nodes, the controller knows the current routing for all flexible nodes (i.e., for each flexible node, each of the multiple next-hop nodes and, optionally, associated traffic fractions, for each destination node).

At step 520, injected traffic values $I_{ud}$ is determined for each flexible node u in the network (i.e., for each flexible node u∈C) for each destination node d in the network (i.e., for each destination node d∈N). In one embodiment, injected traffic values $I_{ud}$ may be determined by each flexible node and transmitted to the controller as a portion of processed traffic measurement information. In one embodiment, injected traffic values $I_{ud}$ may be determined by the controller using raw traffic measurement information transmitted from each flexible node to the controller. An exemplary method for determining injected traffic values $I_{ud}$ is depicted and described herein with respect to FIG. 6.

At step 522, uncontrollable traffic flow g(e) is determined for each link in the network. In one embodiment, uncontrollable traffic flow g(e) may be determined by each flexible node and transmitted to the controller as a portion of processed traffic measurement information. In one embodiment, uncontrollable traffic flow g(e) may be determined by the controller using raw traffic measurement information transmitted from each flexible node to the controller. An exemplary method for determining uncontrollable traffic flow g(e) is depicted and described herein with respect to FIG. 7.

At step 524, a routing table is determined for each flexible node in the network. In one embodiment, each routing table is determined using the current routing of each non-flexible node and each flexible node. In one embodiment, each routing table is determined using the total traffic flow f(e), the injected traffic information ($I_{ud}$) and the uncontrollable traffic information (g(e)). In one embodiment, each routing table is determined for each of the respective flexible nodes as a group in a coordinated manner. In this embodiment, the determination of a routing table for one flexible node is based, at least in part, on the determination of routing tables for each of a plurality of other flexible nodes (e.g., all other flexible nodes in the network, other flexible nodes associated with the same flexible node group, other flexible nodes across a plurality of flexible node groups, and the like, as well as various combinations thereof). At step 526, method 500 ends.

Figure 6:
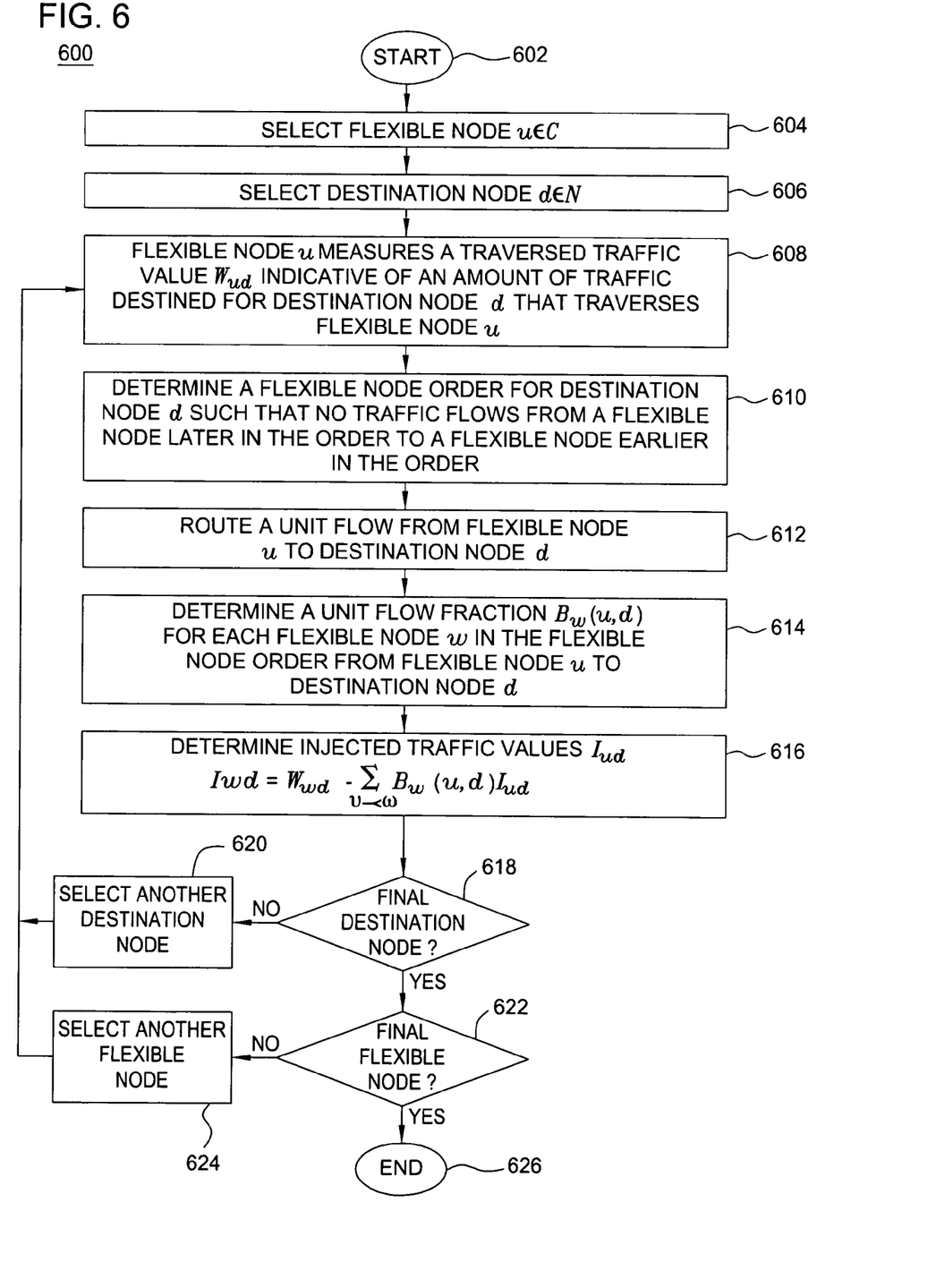
FIG. 6 depicts a method according to one embodiment of the present invention.

FIG. 6 depicts a method according to one embodiment of the present invention. Specifically, method 600 of FIG. 6 includes a method for determining injected traffic values adapted for use in determining routing tables for respective flexible nodes. Although described with respect to operations performed on flexible nodes, in one embodiment, at least a portion of the steps of method 600 may be performed by a controller adapted for determining routing tables for respective flexible nodes. Although depicted and described as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a flexible node u∈C is selected. At step 606, a destination node d∈N is selected. At step 608, flexible node u measures the amount of traffic $W_{ud}$ that traverses node u for destination node d (denoted as a traversed traffic value). The traversed traffic value $W_{ud}$ is indicative of an amount of traffic destined for destination node d that traverses flexible node u. At step 610, a flexible node order is determined for destination node d such that no traffic flows from a flexible node later in the flexible node order to a flexible node earlier in the flexible node order. In one embodiment, the flexible node order is used in order to prevent routing loops for traffic flowing to the destination node d.

At step 612, a traffic flow unit is routed from flexible node u to destination node d. A unit of traffic flow may include any traffic amount (e.g., a packet). At step 614, a unit flow fraction $\beta_w(u,d)$ is determined for each flexible node w in the flexible node order from flexible node u to destination node d. At step 616, injected traffic value $I_{ud}$ is determined for flexible node u and destination node d. In one embodiment, injected traffic value $I_{ud}$ is computed as a difference between: (1) traversed traffic value $W_{ud}$ and (2) a summation of $\beta_w(u,d)I_{ud}$ over all flexible nodes w that appear earlier in the flexible node order than flexible node u.

In one embodiment, a notation may be defined in which u $\prec$ v denotes the fact that flexible node u∈C appears earlier in the flexible node order than flexible node v∈C. For a first flexible node u∈C in the flexible node order, the injected traffic amount for destination node d equals the total traffic amount for destination node d∈N that either originates on or traverses flexible node u∈C (i.e., $I_{ud}=W_{ud}$). For a second flexible node v∈C in the flexible node order, route one traffic unit from flexible node u to destination node d and determine the traffic unit fraction of this traffic unit from flexible node u∈C to destination node d that traverses flexible node v∈C (denoted as $\beta_v(u,d)$).

For this second flexible node v, the injected traffic amount for destination node d equals the difference between the total traffic amount for destination node d∈N that either originates on or traverses flexible node v∈C and the product of: (1) the traffic unit fraction of the traffic unit from flexible node u∈C to destination node d that traverses flexible node v∈C, and (2) the injected traffic amount for destination node d that is injected by flexible node u∈C (i.e., $I_{vd}=W_{vd}-\beta_v(u,d)I_{ud}$). This process may be repeated such that, in general, for a flexible node w∈C in the flexible node order, the injected traffic amount $I_{wd}$ for destination node d that is injected by flexible node w∈C is given by:

$$I_{wd} = W_{wd} - \sum_{u \prec w} \beta_w(u, d) I_{ud} \qquad \text{Eq. 4}$$

At step 618, a determination is made as to whether the final destination node has been considered (for computing $I_{ud}$ values). If the final destination node has not been considered, method 600 proceeds to step 620. At step 620, another destination node d (i.e., a destination node not previous processed for currently selected flexible node u) is selected. If the final destination node was considered, method 600 proceeds to step 622. At step 622, a determination is made as to whether the final flexible node has been considered (for computing $I_{ud}$ values). If the final flexible node has not been considered, method 600 proceeds to step 624. At step 624, another flexible node u (i.e., a flexible node not previous processed) is selected. From steps 620 and 624, method 600 returns to step 608. If the final flexible node was considered, method 600 proceeds to step 626 where method 600 ends.

Figure 7:
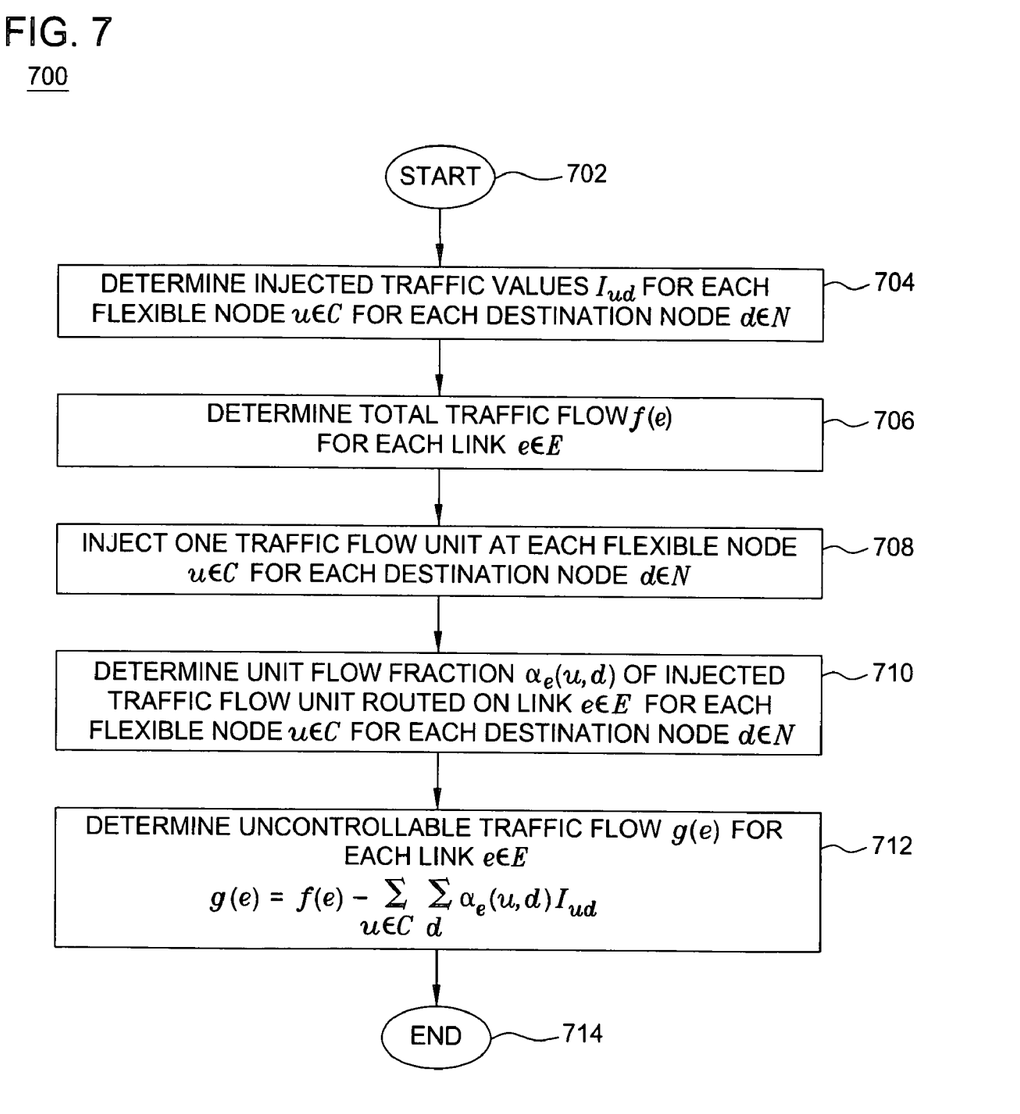
FIG. 7 depicts a method according to one embodiment of the present invention.

FIG. 7 depicts a method according to one embodiment of the present invention. Specifically, method 700 of FIG. 7 includes a method for determining uncontrollable traffic values adapted for use in determining routing tables for respective flexible nodes. Although described with respect to operations performed on flexible nodes, in one embodiment, at least a portion of the steps of method 700 may be performed by a controller adapted for determining routing tables for respective flexible nodes. Although depicted and described as being performed serially, those skilled in the art will appreciate that at least a portion of the steps of method 700 may be performed contemporaneously, or in a different order than presented in FIG. 7. The method 700 begins at step 702 and proceeds to step 704.

At step 704, injected traffic values $I_{ud}$ are determined for each flexible node u∈C for each destination node d∈N. In one embodiment, injected traffic values $I_{ud}$ may be determined using method 600 depicted and described herein with respect to FIG. 6. At step 706, a total traffic flow f(e) is determined for each link in the network (i.e., for each e∈E). In one embodiment, total traffic flow f(e) for each link in the network may be determined using current routing of each non-flexible node and current routing of each flexible node in the network, as depicted and described herein with respect to method 500 of FIG. 5.

At step 708, a traffic flow unit is injected at each flexible node u∈C for each destination node d∈N. At step 710, a unit flow fraction $\alpha_e(u,d)$ of the injected traffic flow unit routed on link e is determined for each flexible node u∈C for each destination node d∈N. The unit flow fraction is representative of the fraction of the traffic flow unit that is routed on link e. At step 712, an uncontrollable traffic flow g(e) is determined for each link e in the network. In one embodiment, uncontrollable traffic flow values g(e) may be determined using injected traffic values $I_{ud}$, total traffic flows f(e), and unit flow fractions $\alpha_e(u,d)$. In one such embodiment, uncontrollable traffic flow values g(e) may be computed as a difference between: (1) total traffic flows f(e) and (2) a summation of $[\alpha_e(u,d) \cdot I_{ud}]$ over all flexible nodes u and all destination nodes (as depicted in Eq. 5). At step 714, method 700 ends.

$$g(e) = f(e) - \sum_{u \in C}\sum_{d} \alpha_e(u,d) I_{ud} \quad \forall\, e \in E \qquad \text{Eq. 5}$$

Although primarily depicted and described herein with respect to a specific formulation of the traffic control problem used for determining flexible node routing tables (i.e., min-max utilization formulation described hereinabove) in which the controller routes traffic to minimize the maximum link utilization Θ of each communication link in the network, in one embodiment, various other traffic control problem formulations may be developed for determining flexible node routing tables. In one such embodiment, a substantially similar formulation of the traffic control problem involves keeping the link capacities associated with the communication links substantially fixed while scaling injected traffic in a manner for conforming the injected traffic to the fixed link capacities.

In one embodiment of this scaling formulation, an objective of the controller is to maximize network throughput (denoted as λ). In one embodiment of this scaling formulation, the variables, which may be solved to any desired level of accuracy (e.g., using a primal-dual algorithm), include path flows associated with paths P (denoted as x(P). In this scaling formulation, if the optimal value of network throughput λ is greater than one (λ>1), then the current traffic may be routed at the flexible nodes while all link utilizations are less than one. In other words, the optimum solution to this scaling formulation is the inverse of the optimum solution to the min-max utilization formulation. In one embodiment, the controller solves the following optimization problem for attempting to maximize network throughput λ:

$$\sum_{P:P\ni e} x(P) \le (c(e) - g(e)) \quad \forall\, e \in E \qquad \text{Eq. 6}$$

$$\sum_{P \in P_{ud}} x(P) \ge \lambda I_{ud} \quad \forall\, u \in C \;\; d \in N \qquad \text{Eq. 7}$$

$$x(P) \ge 0 \quad \forall\, P \qquad \text{Eq. 8}$$

In one embodiment, this scaling formulation is solved by the controller. In one embodiment, the controller computes the injected traffic values $I_{ud}$ on each flexible node and the uncontrollable flow g(e) on each link. In one embodiment, the uncontrollable flow g(e) on each link and the injected traffic values $I_{ud}$ on each flexible node may be computed using network information (e.g., network topology information, link weight information, link capacity information, and like information received by the controller from each of the non-flexible nodes and flexible nodes) and flexible node information (e.g., traffic measurement information measured by the flexible nodes and transmitted from the flexible nodes to the controller).

Although, in previous embodiments described herein, the respective numbers and locations of the flexible nodes within the network were fixed, in one embodiment, the respective numbers and locations of the flexible nodes within the network may be selected. In one such embodiment, given a network of non-flexible nodes, a portion of the non-flexible nodes may be selected for replacement by flexible nodes (i.e., determining a number of non-flexible nodes to replace and determining which non-flexible nodes to replace). Following a determination of the numbers and locations of flexible nodes within a network, the controller may solve a dynamic routing problem for determining routing of traffic at the flexible nodes (i.e., determining the flexible node routing tables associated with the flexible nodes) based on the traffic pattern in the network.

As described herein, a network utilizing flexible nodes out performs a network devoid of flexible nodes. In practice, network performance improvements achieved by replacing a portion of the non-flexible nodes in a network with flexible nodes depends upon the numbers and locations of the flexible nodes within the network. In general, optimum selection of flexible node locations depends on the network traffic matrix (which is not known accurately in advance). In one embodiment, flexible node positions may be selected independent of the network traffic matrix. In another embodiment, flexible node positions may be selected based on an estimate of the network traffic matrix.

As described herein, in one embodiment, flexible node positions may be selected based on an estimate of the network traffic matrix. In one such embodiment, various assumptions may be made for simplifying selection of the flexible node positions. In one embodiment, an assumption may be made that the number of flexible nodes (denoted as h) is known. In one embodiment, as assumption may be made that a tentative traffic matrix (denoted as T, where $T_{sd}$ represents a tentative traffic matrix for traffic between source node s∈N and destination node d∈N) is known. In general, actual traffic in the network deviates from tentative traffic matrix T. In one embodiment, tentative traffic matrix T may be used for determining the placement of the h flexible nodes within the network (i.e., for determining flexible node positions).

In one formulation, the throughput of traffic matrix T over flexible node set C is defined as the largest scalar $\lambda$ such that $\lambda T$ can be routed in the network along permissible paths. In this formulation, throughput may be denoted as $\lambda(T,C)$. In one such formulation, in which C=0 corresponds to the case in which none of the nodes in the network are flexible nodes and C=N corresponds to the case in which each of the nodes in the network are flexible nodes, $\lambda(T,0) \leq \lambda(T,C) \leq \lambda(T,N)$. In one embodiment, $\lambda(T,N)$ may be computed by solving a maximum concurrent flow problem on the network. In one embodiment, given traffic matrix T and number of flexible nodes h, an objective is to determine (for C:|C|=h) maximum throughput $\lambda(T,C)$.

In one embodiment, an incremental greedy approach may be used for solving this throughput maximization formulation. In one such embodiment, an algorithm defines a set of flexible nodes (initially an empty set) and, in each step of the algorithm, a flexible node providing the largest throughput increase is added to the set of flexible nodes until the set of flexible nodes includes h flexible nodes. In one embodiment, this throughput maximization formulation may be solved using a combinatorial Fully Polynomial Time approximation Scheme (FPTAS) for determining a solution within $(1+\epsilon)$ of the optimal solution for any pre-specified value of $\epsilon$.

In one embodiment, in which the objective is to determine a maximum value of $\lambda$ such that $\lambda T$ may be routed in the network, the throughput maximization formulation is similar to a scaling formulation (described hereinabove) in which g(e)=0 for all e∈E (for Eq. 5) and $I_{sd}$ is replaced by $T_{sd}$ (for Eq. 6). In one such embodiment, a link weight I(e) may be associated with link e∈E, and the objective is to minimize $\Sigma_e c(e) I(e)$ subject to the constraint that the sum of the weighted shortest permissible paths between all source-destination node pairs is greater than one.

Figure 8:
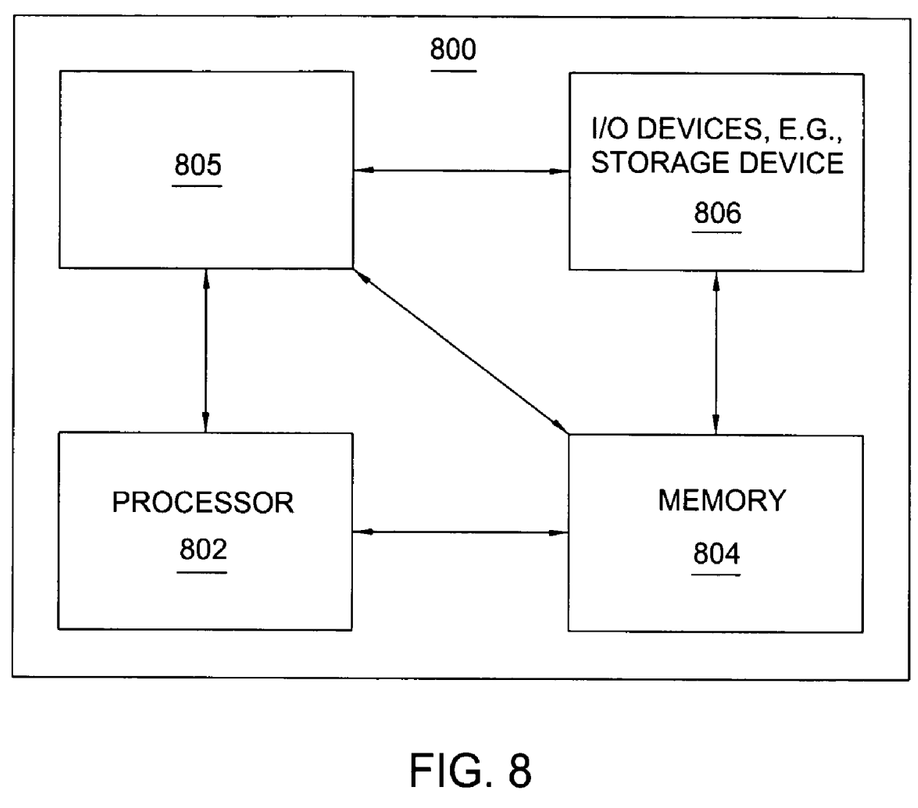
FIG. 8 depicts a high-level block diagram of a general-purpose computer suitable for use in performing the functions described herein.

FIG. 8 depicts a high-level block diagram of a general purpose computer suitable for use in performing the functions described herein. As depicted in FIG. 8, system 800 comprises a processor element 802 (e.g., a CPU), a memory 804, e.g., random access memory (RAM) and/or read only memory (ROM), a routing table control module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present routing table control module or process 805 can be loaded into memory 804 and executed by processor 802 to implement the functions as discussed above. As such, routing table control process 805 (including associated data structures) of the present invention can be stored on a computer readable medium or carrier, e.g., RAM memory, magnetic or optical drive or diskette and the like.

Although primarily described herein with respect to a network in which a plurality of routing tables are determined for a respective plurality of flexible nodes, where each of the flexible nodes belongs to one flexible node group, in one embodiment, routing tables may be determined for respective pluralities of flexible nodes belonging to a respective plurality of different flexible node groups. In one embodiment, although determination of routing tables for flexible nodes in each flexible node group may be performed in a coordinated manner within each of the respective flexible node groups, determination of routing tables for flexible nodes in each flexible node group may be not be performed in a coordinated manner across the respective flexible node groups.

In one embodiment, in which determination of routing tables for flexible nodes in each flexible node group is performed in a coordinated manner within each of the respective flexible node groups, determination of routing tables for flexible nodes in each flexible node group may also be performed in a coordinated manner across at least a portion of the flexible node groups, across various combinations of the flexible node groups, and the like, as well as various combinations thereof. Thus, the present invention is not intended to be limited by flexible node groupings, determination of routing tables for various flexible nodes within a flexible node group, determination of routing tables for various flexible nodes across various combinations of flexible node groups, and the like, as well as various combinations thereof.

Although primarily described herein with respect to standard routers (also referred to herein as non-flexible routers) and enhanced routers (also referred to herein as flexible routers), the present invention may be used for determining routing tables for various other network elements. Thus, flexible routers may also be referred to herein as type-one routers (or, alternatively, type-one nodes) and non-flexible routers may also be referred to herein as type-two routers (or, alternatively, type-two nodes). As such, the present invention is not intended to be limits to specific types of network elements which may route traffic across a network.

Although primarily described herein with respect to a specific network configuration, the present invention may be used in networks having various other network configurations. Although primarily described herein with respect to an MPLS/IP-based network, the present invention may be used in communication networks employing various other protocol combinations. Although primarily described herein with respect to routers, the present invention may be used in communication networks including various other node types. As such, the present invention is not intended to be limited by network configuration, network protocols, network node types, and like configurable network parameters, as well as various combinations thereof.

Although various embodiments which incorporate the teachings of the present invention have been shown and described in detail herein, those skilled in the art can readily devise many other varied embodiments that still incorporate these teachings.

What is claimed is:

1. A method for determining a routing table for use in a network comprising a plurality of type-one nodes and a plurality of type-two nodes, the type-two nodes using respective type-two routing tables comprising one next-hop node associated with each of a plurality of destination nodes, comprising:
- obtaining link status information associated with each of a plurality of links of the network from the type-one nodes and the type-two nodes;
- obtaining traffic measurement information from the type-one nodes and the type-two nodes; and
- determining, using the link status and traffic measurement information, a plurality of type-one routing tables for the respective type-one nodes, the type-one routing tables being determined for the type-one nodes as a group in a substantially coordinated manner, each type one routing table comprising a plurality of next-hop nodes associated with each of the destination nodes.

2. The method of claim 1, wherein the link status information comprises link weight information and link capacity information.

3. The method of claim 1, wherein the traffic measurement information comprises link utilization information, injected traffic information, and one of controllable traffic information or uncontrollable traffic information.

4. The method of claim 1, wherein determining each of the type-one routing tables comprises:
- determining an injected traffic value comprising an amount of traffic injected by the type-one node for each combination of the type-one node and at least one destination node from said plurality of type-two nodes;
- determining an uncontrollable traffic value for each of at least one link coupled to the type-one node; and
- determining the type-one routing table using the injected traffic values and the uncontrollable traffic values.

5. The method of claim 4, wherein determining the injected traffic value for each combination of the type-one node and the at least one destination node, comprises:
- determining a traversed traffic value for each combination of the type-one node and the at least one destination node, each traversed traffic value comprising an amount of traffic destined for the at least one destination node which traverses the type-one node; and
- determining the injected traffic values using the traversed traffic values.

6. The method of claim 5, wherein each traversed traffic value is determined by the type-one node using at least one traffic measurement.

7. The method of claim 4, wherein determining the injected traffic value for each combination of the type-one node and the at least one destination node, comprises:
- determining a traversed traffic value for each combination of the type-one node and the at least one destination node;
- determining a first unit flow fraction comprising a fraction of a unit flow from the type-one node to the at least one destination node that traverses an intermediate node; and
- determining the injected traffic values using the traversed traffic values and the first unit flow fraction.

8. The method of claim 4, wherein determining the uncontrollable traffic value for each of at least one link coupled to the type-one node, comprises:
- determining a total flow for each of the at least one link;
- determining a second unit flow fraction for each of the at least one link; and
- determining the uncontrollable traffic value using the total flow, the second unit flow fraction, and the injected traffic values.

9. The method of claim 8, wherein determining the total flow for each of the at least one link, comprising:
- obtaining topology information from each of the plurality of nodes;
- obtaining link weight information associated with each of the at least one link; and
- determining the total flow for each of the at least one link using the topology information and the link weight information associated with each of the at least one link.

10. The method of claim 1, further comprising:
- obtaining other traffic measurement information from another plurality of type-one nodes; and
- determining, using the link status and other traffic measurement information, another plurality of type-one routing tables for the respective other type-one nodes, the other type-one routing tables being determined for the other type-one nodes as another group in a substantially coordinated manner, each other type one routing table comprising a plurality of next-hop nodes associated with each of the destination nodes.

11. An apparatus for determining a routing table for use in a network comprising a plurality of type-one nodes and a plurality of type-two nodes, the type-two nodes using respective type-two routing tables comprising one next-hop node associated with each of a plurality of destination nodes, comprising:
- means for obtaining link status information associated with each of a plurality of links of the network from the type-one node and the type-two nodes;
- means for obtaining traffic measurement information from the type-one nodes and the type-two nodes; and
- means for determining, using the link status and traffic measurement information, a plurality of type-one routing tables for the respective type-one nodes, the type-one routing tables being determined for the type-one nodes as a group in a substantially coordinated manner, each type one routing table comprising a plurality of next-hop nodes associated with each of the destination nodes.

12. A method for routing traffic at one of a plurality of type-one nodes in a network comprising the type-one nodes and a plurality of type-two nodes, the type-two nodes using respective type-two routing tables comprising one next-hop node associated with each of a plurality of destination nodes, comprising:
- routing traffic at the one of the type-one nodes using an associated type-one routing table comprising a plurality of next-hop nodes associated with each of the destination nodes;
- wherein a plurality of type-one routing tables including the type-one routing table associated with the one of the type-one nodes is determined using link status information and traffic measurement information from the type-one nodes and the type-two nodes, the type-one routing tables being determined for the type-one nodes as a group in a substantially coordinated manner.

13. The method of claim 12, wherein the link status information comprises link weight information and link capacity information.

14. The method of claim 12, wherein the traffic measurement information comprises link utilization information, injected traffic information, and one of controllable traffic information of uncontrollable traffic information.

15. The method of claim 12, wherein each of the type-one routing tables is determined using a method comprising:
- determining an injected traffic value comprising an amount of traffic injected by the type-one node for each combination of the type-one node and at least one destination node from said plurality of type-two nodes;

determining an uncontrollable traffic value for each of at least one link coupled to the type-one node; and determining the type-one routing table using the injected traffic values and the uncontrollable traffic values.

16. The method of claim 15, wherein determining the injected traffic value for each combination of the type-one node and the at least one destination node, comprises:

determining a traversed traffic value for each combination of the type-one node and the at least one destination node, each traversed traffic value comprising an amount of traffic destined for the at least one destination node which traverses the type-one node; and determining the injected traffic values using the traversed traffic values.

17. The method of claim 16, wherein each traversed traffic value is determined by the type-one node using at least one traffic measurement.

18. The method of claim 15, wherein determining the injected traffic value for each combination of the type-one node and the at least one destination node, comprises:

determining a traversed traffic value for each combination of the type-one node and the at least one destination node;

determining a first unit flow fraction comprising a fraction of a unit flow from the type-one node to the at least one destination node that traverses an intermediate node; and determining the injected traffic values using the traversed traffic values and the first unit flow fraction.

19. The method of claim 15, wherein determining the uncontrollable traffic value for each of at least one link coupled to the type-one node, comprises:

determining a total flow for each of the at least one link;

determining a second unit flow fraction for each of the at least one link; and determining the uncontrollable traffic value using the total flow, the second unit flow fraction, and the injected traffic values.

20. The method of claim 19, wherein determining the total flow for each of the at least one link, comprising:

obtaining topology information from each of the plurality of nodes;

obtaining link weight information associated with each of the at least one link; and determining the total flow for each of the at least one link using the topology information and the link weight information associated with each of the at least one link.

21. A system for manipulating traffic within a network, comprising:

a plurality of type-one nodes using respective type-one routing tables, each type-one routing table comprising a plurality of next-hop nodes associated with each of a plurality of destination nodes;

a plurality of type-two nodes using respective type-two routing tables, each type-two routing table comprising one next-hop node associated with each of the destination nodes; and a controller in communication with the type-one and type-two nodes, the controller adapted for determining the type-one routing tables using link status information and traffic measurement information obtained from the type-one nodes and the type-two nodes, the controller adapted for determining the type-one routing tables for the type-one nodes as a group in a substantially coordinated manner.

22. A method for determining a routing table for use in a network comprising a type-one node and a plurality of type-two nodes, the type-two nodes using respective type-two routing tables comprising one next-hop node associated with each of a plurality of destination nodes, comprising:

obtaining status information from the type-one node and the type-two nodes; and determining, using the status information, a type-one routing table for the type-one node comprising a plurality of next-hop nodes associated with each of the destination nodes.

* * * * *